United States Patent
Moon

(10) Patent No.: US 9,832,292 B2
(45) Date of Patent: Nov. 28, 2017

(54) ELECTRONIC DEVICE AND METHOD FOR MANUFACTURING HOUSING OF THE ELECTRONIC DEVICE

(71) Applicant: Samsung Electronics Co., Ltd., Gyeonggi-do (KR)

(72) Inventor: Hee-Cheul Moon, Gyeonggi-do (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 205 days.

(21) Appl. No.: 14/559,500

(22) Filed: Dec. 3, 2014

(65) Prior Publication Data

US 2015/0245513 A1    Aug. 27, 2015

(30) Foreign Application Priority Data

Feb. 21, 2014    (KR) .................. 10-2014-0020942

(51) Int. Cl.
| | |
|---|---|
| G06F 1/16 | (2006.01) |
| H04M 1/02 | (2006.01) |
| G06F 1/20 | (2006.01) |
| H04B 1/38 | (2015.01) |
| H04B 1/3888 | (2015.01) |
| H01Q 1/24 | (2006.01) |
| H01Q 9/42 | (2006.01) |

(52) U.S. Cl.
CPC .............. *H04M 1/02* (2013.01); *G06F 1/16* (2013.01); *G06F 1/1601* (2013.01); *G06F 1/20* (2013.01); *H01Q 1/243* (2013.01); *H01Q 9/42* (2013.01); *H04B 1/38* (2013.01); *H04B 1/3888* (2013.01); *H04M 1/0202* (2013.01)

(58) Field of Classification Search
CPC ....................................................... H04M 1/02
See application file for complete search history.

(56) References Cited

U.S. PATENT DOCUMENTS

| | | | | |
|---|---|---|---|---|
| 6,535,172 B2 * | 3/2003 | Hirabayashi | .......... | G06F 1/1632 343/700 MS |
| 6,957,085 B2 * | 10/2005 | Shin | ...................... | G06F 1/1616 455/556.1 |
| 7,072,690 B2 * | 7/2006 | Shin | ...................... | G06F 1/1616 343/702 |

(Continued)

FOREIGN PATENT DOCUMENTS

KR    10-2013-0015198    2/2013

*Primary Examiner* — Hoa C Nguyen
*Assistant Examiner* — Keith Depew

(57) ABSTRACT

An electronic device includes an inner case, at least one radiator disposed on a surface of the inner case, and an outer case integrally formed on the surface of the inner case, in which the outer case at least partially conceals the radiator. A method for manufacturing a housing of an electronic device includes molding an inner member by injecting resin into an injection mold, extracting the inner member from the mold, forming or disposing a conductive pattern on a surface of the inner member, inserting the inner member comprising the conductive pattern into another injection mold, and molding a periphery member that encloses at least a portion of the inner member by injecting resin to the other injection mold, wherein rigidity or stiffness of the inner member is higher than that of the periphery member. Other embodiments are also disclosed.

14 Claims, 10 Drawing Sheets

(56) References Cited

U.S. PATENT DOCUMENTS

| | | | | |
|---|---|---|---|---|
| 8,457,699 B2* | 6/2013 | Ayatollahi | ............. | H01Q 1/243 343/700 MS |
| 8,559,192 B2* | 10/2013 | Murakata | ............... | G06F 1/1601 345/905 |
| 8,618,989 B2* | 12/2013 | Sung | ................. | B29C 45/14065 343/702 |
| 8,643,547 B2* | 2/2014 | Hong | ................... | B29C 45/1671 29/600 |
| 8,790,121 B2* | 7/2014 | Hirakawa | ............ | H01R 12/721 439/582 |
| 8,922,980 B2* | 12/2014 | Allore | ................... | H04M 1/026 361/679.01 |
| 9,124,676 B2* | 9/2015 | Allore | ................. | H04M 1/0202 |
| 9,143,586 B2* | 9/2015 | Allore | ................. | H04M 1/0202 |
| 9,300,033 B2* | 3/2016 | Han | ....................... | H01Q 1/243 |
| 9,337,543 B2* | 5/2016 | Jung | ...................... | H01Q 1/243 |
| 9,464,360 B2* | 10/2016 | Chung | .................. | G06F 1/1656 |
| 9,509,813 B2* | 11/2016 | Chung | ................ | H04M 1/0249 |
| 2012/0329524 A1* | 12/2012 | Kent | ....................... | G06F 3/044 455/566 |
| 2013/0076573 A1* | 3/2013 | Rappoport | ............. | H01Q 1/243 343/702 |
| 2013/0082883 A1* | 4/2013 | Montevirgen | ......... | H01Q 1/243 343/702 |

* cited by examiner

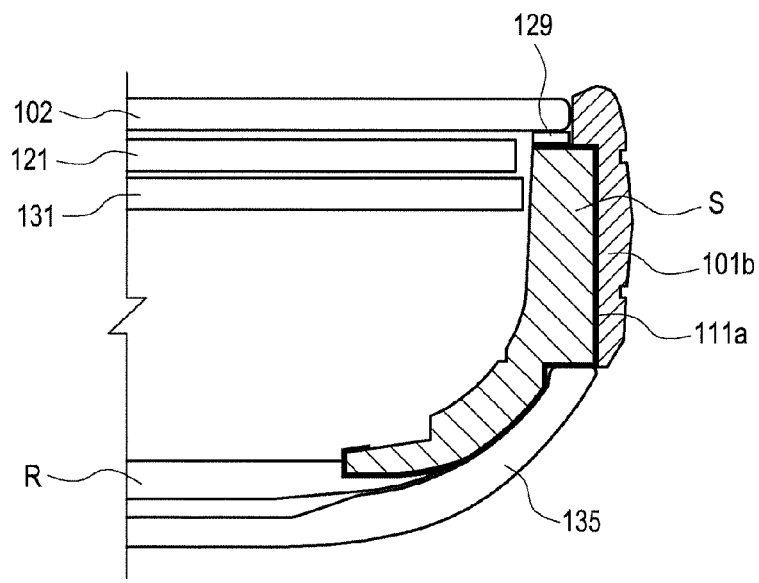
FIG.6
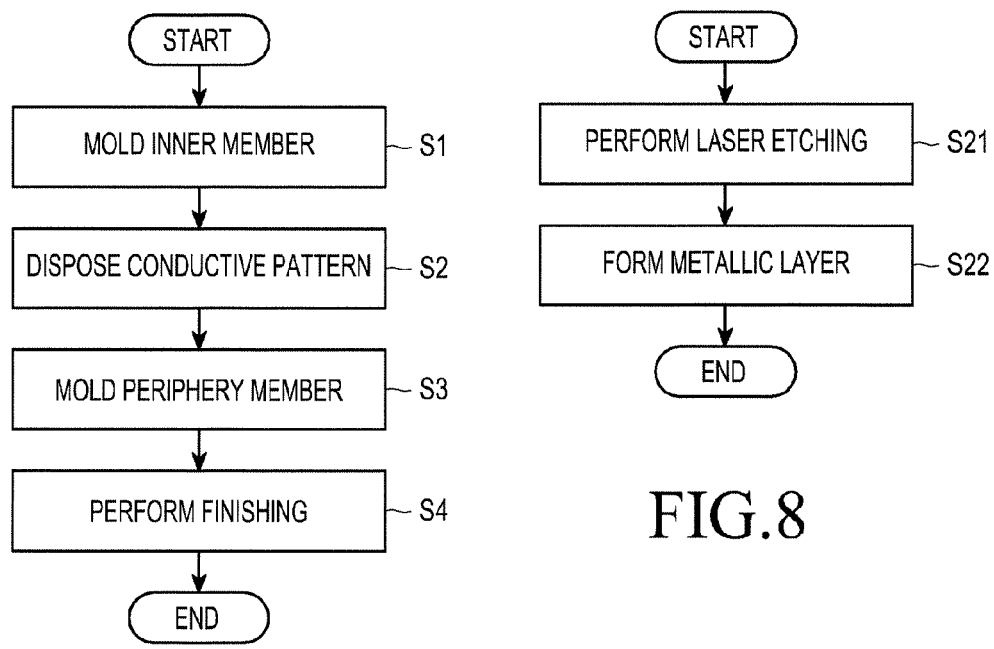
FIG.7
FIG.8

ND METHOD FOR
ELECTRONIC DEVICE AND METHOD FOR MANUFACTURING HOUSING OF THE ELECTRONIC DEVICE

CROSS-REFERENCE TO RELATED APPLICATION AND CLAIM OF PRIORITY

The present application is related to and claims priority under 35 U.S.C. §119(a) to Korean Patent Application Serial No. 10-2014-0020942, which was filed in the Korean Intellectual Property Office on Feb. 21, 2014, the entire disclosure of which is hereby incorporated by reference.

TECHNICAL FIELD

Various embodiments of the present disclosure relate to an electronic device, and more particularly, to a case of an electronic device and a method for manufacturing the case.

BACKGROUND

An electronic device refers to a device that performs a particular function, for example, outputs stored information as audio or video, according to an embedded program. The electronic device may be embodied as an electronic appliance, an electronic note, a portable multimedia player, a mobile communication terminal, a tablet Personal Computer (PC), a video/audio device, a desktop/laptop computer, a vehicle navigation system, or the like. As the integration of an electronic device has increased and high-volume and ultra-high-speed wireless communication has come into common use, various functions are able to be mounted on a single mobile communication terminal. For example, a mobile communication terminal includes a communication function as well as an entertainment function such as a game, a multimedia function for playback of music/video, communication and security functions for mobile banking, and a function for schedule management or an electronic wallet.

The electronic device is capable of providing various functions to users through wireless communication. The electronic device may include antennas having various forms or structures for communication using various frequencies.

According to existing technologies, there may be numerous difficulties in securing a space for installing an antenna in an electronic device, for example, a mobile communication terminal. For instance, due to downsizing of an electronic device, it may be difficult to secure a sufficient physical interval between circuit devices and the antenna.

When a radiator included as at least a portion of the antenna is disposed in adjacent to the surface of the electronic device, a physical distance between circuit devices (for example, a Printed Circuit Board (PCB) interconnection, a PCB ground, a semiconductor chip, a resistance capacitor, or an inductor) and the radiator included as at least a portion of the antenna may be secured, but radiation performance may be distorted by an influence of a human body.

SUMMARY

To address the above-discussed deficiencies, it is a primary object to provide an electronic device capable of suppressing distortion of radiation characteristics, caused by an influence of a human body while securing a sufficient physical interval between circuit devices or a conductive material and a radiator included as at least a portion of an antenna, and a method for manufacturing a housing of the electronic device.

Various aspects of the present disclosure also provide an electronic device capable of securing rigidity or stiffness while facilitating size reduction and weight reduction, and a method for manufacturing a housing of the electronic device.

Various aspects of the present disclosure also provide an electronic device capable of efficiently using an internal space to contribute to improvement of integration.

Other objects to be provided in the present disclosure may be understood by embodiments described below.

According to an aspect of the present disclosure, there is provided an electronic device including a housing, a periphery member forming at least a portion of an edge of the housing and including a non-metallic material, an inner member that forms at least a portion of the housing inside the periphery member, is formed along at least a portion of the edge in adjacent to the periphery member, and includes a metallic material, and a conductive pattern, at least a portion of which is inserted between the periphery member and the inner member, in which the inner member has higher rigidity or stiffness than the periphery member.

According to another aspect of the present disclosure, there is provided a method for manufacturing a housing of an electronic device, the method including injecting resin into an injection mold to mold an inner member, extracting the inner member from the mold, forming or disposing a conductive pattern on a surface of the inner member, and inserting the inner member including the conductive pattern into the injection mold and injecting resin to mold a periphery member that encloses at least a portion of the inner member, in which rigidity or stiffness of the inner member is higher than that of the periphery member.

Other aspects, advantages, and salient features of the disclosure will become apparent to those skilled in the art from the following detailed description, which, taken in conjunction with the annexed drawings, discloses an exemplary embodiment of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 6 is a cross-sectional view of a state in which a conductive pattern is disposed in an electronic device according to one of various embodiments of the present disclosure;

FIG. 7 is a flowchart illustrating a method for manufacturing a case of an electronic device according to one of various embodiments of the present disclosure;

FIG. 8 is a flowchart illustrating an operation of disposing a conductive pattern in a case of an electronic device according to one of various embodiments of the present disclosure;

Throughout the drawings, like reference numerals will be understood to refer to like parts, components, and structures.

DETAILED DESCRIPTION

Figure 1:
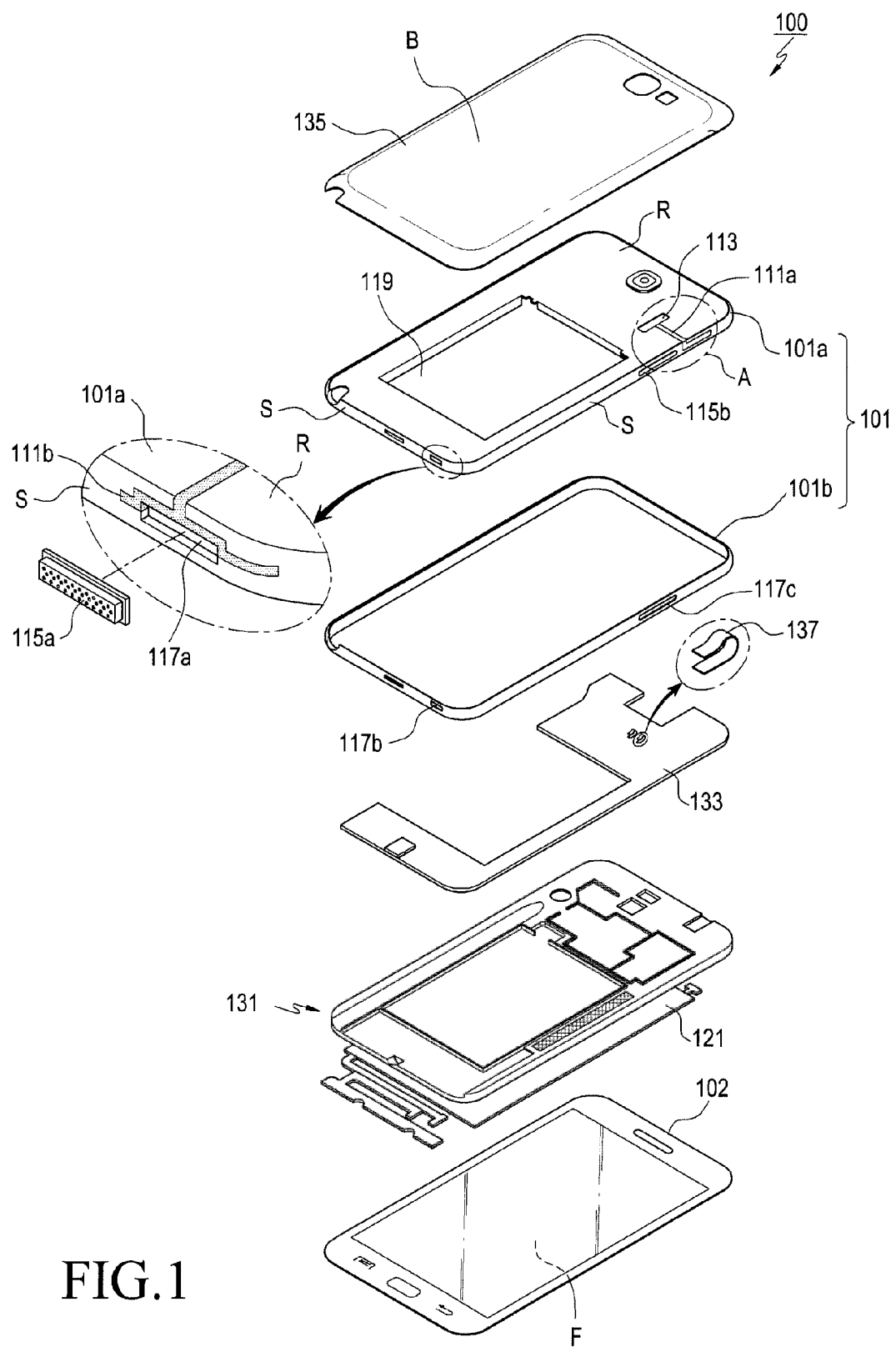
FIG. 1 is an exploded perspective view of an electronic device according to one of various embodiments of the present disclosure.

FIGS. 1 through 16, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic devices.

Hereinafter, various embodiments of the present disclosure will be described with reference to the accompanying drawings. In a description of the embodiments of the present disclosure, related well-known functions or structures will not be described in detail if they unnecessarily obscure the subject matter of the present disclosure. Terms used herein are defined for functions in the present disclosure and may vary according to users, intentions of operators, or practice. Thus, the terms should be defined more clearly based on the entire contents of various embodiments of the present disclosure. Although ordinal numbers such as "first", "second", and so forth will be used in an embodiment described below, they are merely intended to distinguish objects having the same name, their order may be set arbitrarily, and the preceding description of an object may be applied to a next-order object.

Various embodiments of the present disclosure may be changed variously and may have a variety of embodiments, such that particular embodiments have been illustrated in the drawings and a related detailed description thereof will be provided below. However, this is not intended to limit the various embodiments to particular embodiments, and should be understood that all changes, equivalents, or substitutes included in the spirit and technical scope of the present disclosure are included in the scope of the present disclosure.

Although ordinal numbers such as "first," "second," and so forth will be used to describe various components of the present disclosure, those components are not limited by the terms. The terms are used only for distinguishing one component from another component. For example, a first component may be referred to as a second component and likewise, a second component may also be referred to as a first component, without departing from the teaching of the inventive concept. The term "and/or" used herein includes any and all combinations of one or more of the associated listed items.

Relative terms used based on illustration in the drawings, such as a 'front side', a 'rear side', a 'top surface', a 'bottom surface', and the like, may be replaced with ordinal numbers such as 'first', 'second', and the like. The order of the ordinal numbers such as 'first', 'second', and the like is a mentioned order or an arbitrarily set order, and may be changed as needed.

Each programming module used herein may include software, firmware, hardware, or a combination of at least two of them.

The terminology used herein is for the purpose of describing an embodiment only and is not intended to be limiting of an embodiment. As used herein, the singular forms are intended to include the plural forms as well, unless the context clearly indicates otherwise. It will be further understood that the terms "comprises" and/or "has" when used in this specification, specify the presence of a stated feature, number, step, operation, component, element, or a combination thereof but do not preclude the presence or addition of one or more other features, numbers, steps, operations, components, elements, or combinations thereof.

Unless defined otherwise, all terms used herein have the same meanings as generally understood by those having ordinary knowledge in the technical field to which the present disclosure pertains. Terms generally used and defined in dictionaries should be interpreted as having meanings consistent with meanings construed in the context of the related art, and should not be interpreted as having ideal or excessively formal meanings unless defined explicitly in this application.

In various embodiments of the present disclosure, an electronic device may be an arbitrary device having a touch panel and may be referred to as a terminal, a portable terminal, a mobile terminal, a communication terminal, a portable communication terminal, a portable mobile terminal, a display, or the like.

For example, the electronic device may be a smart phone, a cellular phone, a navigation device, a game console, a TeleVision (TV), a vehicle head unit, a laptop computer, a tablet computer, a Personal Media Player (PMP), a Personal Digital Assistant (PDA), or the like. The electronic device may be implemented with a pocket-size portable communication terminal having a wireless communication function. The electronic device may be a flexible device or a flexible display.

The electronic device may communicate with an external electronic device such as a server or may work by cooperating with the external electronic device. For example, the electronic device may transmit an image captured by a camera and/or position information detected by a sensor unit to the server over a network. The network may be, but not limited to, a mobile or cellular communication network, a Local Area Network (LAN), a Wireless Local Area Network (WLAN), a Wide Area Network (WAN), Internet, or a Small Area Network (SAN).

FIG. 1 is an exploded perspective view of an electronic device according to one of various embodiments of the present disclosure.

An electronic device according to one of various embodiments of the present disclosure includes a housing, a periphery member that forms at least a portion of an edge of the housing and includes a non-metallic material, an inner member that forms at least a portion of the housing inside the periphery member, is formed along a portion of the edge in adjacent to the periphery member, and includes a metallic material, and a conductive pattern, at least a portion of which is inserted between the periphery member and the inner member, in which the inner member has higher rigidity or stiffness than the periphery member.

According to an embodiment, the housing includes a front side and a back side facing the opposite side of the front side, and the inner member includes a rear surface portion forming at least a portion of the back side of the housing and a side portion extending from the rear surface portion along the edge, and the periphery member is formed to enclose at least a portion of the rear surface portion or the side portion.

According to another embodiment, at least a portion of the conductive pattern is disposed between the side portion and the periphery member.

According to another embodiment, the inner member substantially has a rectangular frame shape in adjacent to the edge of the housing or has a frame shape in at least a portion of which a gap is formed.

The electronic device according to various embodiments of the present disclosure further includes a bracket which is coupled to a portion of the side portion of the inner member and faces the front side and a window member at least partially contained in a space formed by the bracket and the side portion.

According to an embodiment, the electronic device further includes a sealing member interposed between at least a portion of an edge of the window member and at least a portion of the side portion of the inner member.

According to another embodiment, at least a portion of the conductive pattern is formed in the side portion of the inner member to be disposed to face the front side of the housing.

According to another embodiment, the window member is positioned to be enclosed by the periphery member and a portion of an inner surface of the window member is directly and indirectly supported on the side portion.

An electronic device according to various embodiments of the present disclosure further includes a bracket disposed to face the inner surface of the window member and a support rib formed in an edge of the bracket, in which the support rib is interposed between the side portion and the window member.

According to an embodiment, the conductive pattern extends from an outer surface of the side portion to the inner surface of the inner member through the outer surface of the rear portion.

An electronic device according to another one of various embodiments of the present disclosure further includes an opening formed to pass through the side portion of the inner member and an accessory member formed of a conductive material in the opening, in which the accessory member is electrically connected to the conductive pattern.

According to an embodiment of the present disclosure, the accessory member includes a mesh grill for a speaker output hole, a key, an interface connector (for example, an ear-jack, a Universal Serial Bus (USB) terminal, or the like) deco, a camera deco or cover. In a detailed description of the present disclosure, a term "metallic layer" or "print layer" may be used to refer to a conductive pattern separately manufactured and adhered such as a thin film (metallic thin film) or a Flexible Printed Circuit Board (FPCB) as well as a conductive pattern formed by plating/deposition/printing. The term "metallic layer" may refer to a layer formed of a non-metallic material including a metallic material or metallic powder as well as a layer purely formed of metal.

According to an embodiment, the inner member includes synthetic resin including at least one of glass fiber and carbon fiber.

According to another embodiment, the conductive pattern includes any one of a metallic layer formed on the surface of the inner member using one of various methods available in this field, a print layer formed of a conductive paint or ink on the surface of the inner member, a metallic thin film adhered to the surface of the inner member, and a FPCB.

An electronic device according to various embodiments of the present disclosure includes an auxiliary member coupled to enclose at least a portion of the inner member and another conductive pattern disposed on the surface of the auxiliary member.

According to an embodiment, the other conductive pattern is electrically connected to the conductive pattern.

According to another embodiment, the electronic device further includes a sensor module connected to the conductive pattern and at least one communication module connected to the conductive pattern.

According to another embodiment, the sensor module detects an approach or contact of a conductor from a change in a capacitance or resistance of the conductive pattern.

According to various embodiments of the present disclosure, the electronic device further includes a communication module in the housing, a connection member contacting the conductive pattern, and a wiring portion electrically connecting the connection member with the communication module.

Referring to FIG. 1, an electronic device 100 according to one of various embodiments of the present disclosure can include a case or housing 101 including an inner member 101*a* (for example, an inner case, a front case, an inner housing, or a front housing) and a periphery member 101*b*

(for example, an outer case, a side case, an external housing, or a side housing) and at least one conductive patterns 111a and 111b, at least a portion of which is inserted between the inner member 101a and the periphery member 101b. The inner member 101a can substantially have a rectangular frame shape. In an embodiment, a gap is formed in at least a portion of the inner member 101a to receive at least a portion of an auxiliary member 101c to be described below. The periphery member 101b is integrally formed in the inner member 101a such that at least a portion of the conductive patterns 111a and 111b is not visually seen. Although it is illustrated in the drawings that the periphery member 101b is separated from the inner member 101a, such illustration is intended to facilitate a description. For example, the periphery member 101b can be integrally formed in the inner member 101a by insert injection or double injection. The periphery member 101b can be configured removable from the inner member 101a.

The inner member 101a is manufactured of a non-metallic material including metallic particles, and forms at least a portion of the housing. For example, the inner member 101a is made of a non-conductive material such as polycarbonate, glass fiber, and carbon fiber or a combination of non-conductive materials. According to an embodiment, a material for manufacturing the inner member 101a can contain metallic particles. The inner member 101a is disposed in an edge of the case or housing 101 of the electronic device 100 to form at least a portion, and includes a rear side R and a side portion S to form a space for receiving circuit devices such as a main circuit board 133. A battery receiving portion 119 is form in at least a portion of the rear side R to provide a space for mounting a battery pack. The side portion S is formed in a side of the rear side R to form a space for receiving circuit devices, together with the rear side R.

At least one first opening 117a for various connectors or input/output devices is formed in at least a portion of the inner member 101a. For example, the first opening 117a can be formed to pass through the side portion S, thus providing a path for inputting or outputting audio. Depending on a position where the opening 117a is formed or a purpose for which the opening 117a is formed, the opening 117a can provide a photographing path, a space for disposing a side key, or a connection path for various connectors if the electronic device 100 includes a camera module.

The first opening 117a is coupled with the accessory member. For example, the accessory members 115a and 115b made of a conductive material can be disposed to improve aesthetic sense of an exterior design. The accessory members 115a and 115b can be used to prevent introduction of a foreign substance or as an input device as well as to provide an accessory effect. For example, the first opening 117a can be formed as a path for input/output of sound and the accessory member 115a can be made of conductive metal and can be used as a mesh grill for a speaker output hole. The mesh grill for the speaker output hole can prevent introduction of a foreign substance. The accessory member 115b can be provided as a physical key disposed in a side of the case or housing 101 of the electronic device 100, such as a power key or a volume control key. To expose the physical key disposed on the inner member 101a to the outside of the case or the housing 101, another opening 117c can be formed in at least a portion of the periphery member 101b. In an embodiment, the physical key is made of a synthetic resin material and an accessory member formed of a conductive material is provided along a circumference of the physical key. While a mesh grill or a physical key is used as an example of the accessory members 115a and 115b in the current embodiment, a cap or an accessory of an ear-jack hole, an interface connector, a camera module, or the like and another accessory disposed on the exterior of the electronic device 100 can also be included.

According to various embodiments, the accessory members 115a and 115b made of a conductive material can be disposed in adjacent to at least one of the conductive patterns 111a and 111b. According to an embodiment, the accessory members 115a and 115b can be electrically connected to the conductive patterns 111a and 111b. The accessory members 115a and 115b are formed in adjacent to the conductive patterns 111a and 111b to be connected (for example, an induced electromotive force) through a non-conductive material (for example, air, polycarbonate, or glass). For example, the conductive pattern 11b can be formed in at least a portion of the first opening 117a. In this case, the accessory member 115a coupled to the first opening 117a can be electrically connected to the conductive pattern 111b directly or through another conductive material (for example, a shield foam).

According to an embodiment, the conductive patterns 111a and 111b can be disposed on the surface of the inner member 101a, for example, at least one of the conductive patterns 111a and 111b can be formed or disposed on at least a portion of an outer surface of the inner member 101a. According to an embodiment, at least one of the conductive patterns 111a and 111b can be formed or disposed in at least a portion of an inner surface of the periphery member 101b (for example, an inner surface of the periphery member 101b formed to contact the inner member 101a). In this case, at least one of the conductive patterns 111a and 111b can be electrically connected to the inner member 101a through a conductive contact point (not shown) formed in at least a portion of the inner surface of the periphery member 101b. The conductive patterns 111a and 111b can be formed as radiators of an antenna for providing wireless transmission/reception of the electronic device 100. If the conductive patterns 111a and 111b are formed as radiators, an accessory member electrically connected to the conductive patterns 111a and 111b can also be formed as a portion of the radiator. According to another embodiment, the conductive patterns 111a and 111b can be formed as sensors (for example, a touch sensor, a grip sensor, or a proximity sensor). According to an embodiment, the electronic device 100 can sense, through the conductive patterns 111a and 111b, a change in an input value (for example, a unique resistance or capacitance) corresponding to an approach or contact of a human body. According to an embodiment, the electronic device 100 can sense a user input (for example, menu selection or execution or screen scroll) through the conductive patterns 111a and 111b to implement various operations. According to an embodiment, if the conductive patterns 111a and 111b are used as a sensor, they can be formed in a grid form or linear form, or in a form in which a bending portion is included in at least a portion of the conductive patterns 111a and 111b.

According to an embodiment, the conductive patterns 111a and 111b extend from an outer surface of the side portion S to an inner surface of the inner member 101a through the rear portion R. In at least a portion of the inner member 101a, a slit or slot 113 can be formed. The conductive patterns 111a and 111b can extend from the outer surface of the inner member 101a to the inner surface of the inner member 101a through an inner sidewall of the slit or the slot 113.

At least a portion of the conductive patterns 111a and 111b is formed on the side portion S to face a front side F of the electronic device 100 or the case or housing 101. In an embodiment, another conductive pattern can be formed on the side portion S to face the front side F of the electronic device 100. Referring to FIG. 1, the conductive patterns 111*a* and 111*b* are formed a portion A of an upper portion of the inner member 101*a* and a lower portion of the inner member 101*a*. As such, at least one of the conductive patterns 111*a* and 111*b* can be formed on the surface of the inner member 101*a* or the inner surface of the periphery member 111*b*.

According to an embodiment, the conductive patterns 111*a* and 111*b* can be formed on the surface of the inner member 101*a* by plating or deposition. The conductive patterns 111*a* and 111*b* can be formed of a combination of one or more of a metallic layer, a print layer formed of a conductive paint or ink on the surface of the inner member 101*a*, a thin film adhered to the surface of the inner member 101*a* (for example, a metallic thin film formed of gold or copper), and an FPCB. The conductive patterns 111*a* and 111*b* will be described in more detail below with reference to FIGS. 2 and 3.

The periphery member 101*b* is disposed at least in an edge of the case or housing 101, and is formed integrally on the surface of the inner member 101*a* by insert injection or double injection. For example, the inner member 101*a* in which the conductive patterns 111*a* and 111*b* are disposed is disposed in an injection mold and then the periphery member 101*b* is molded, such that the periphery member 101*b* is formed integrally in the inner member 101*a*. The periphery member 101*b* is formed to enclose the outer surface of the side portion S. On the outer surface of the side portion S, at least a portion of the conductive patterns 111*a* and 111*b* is inserted between the inner member 101*a* and the periphery member 101*b*, thus being concealed by the periphery member 101*b*. In the periphery member 101*b*, a second opening 117*b* is formed. The second opening 117*b* is formed corresponding to the first opening 117*a* formed in the inner member 101*a*. For example, if the first opening 117*a* is used for input/output of sound, a connection path of various connectors, or disposition of a side key, the second opening 117*b* corresponding to the first opening 117*a* can be formed also in the periphery member 101*b*.

As the periphery member 101*b* is formed integrally in the inner member 101*a*, the case or housing 101 of the electronic device 100 can be completed. When the case or housing 101 of the electronic device 100 is configured by insert injection or double injection, the inner member 101*a* can be formed of synthetic resin having a rigid or stiff material, for example, PolyCarbonate (PC) including glass fiber or carbon fiber. As the inner member 101*b* is made of synthetic resin including glass fiber or carbon fiber, the rigidity or stiffness of the inner member 101*a* can be improved. As the rigidity of the inner member 101*a* is improved, deformation of the electronic device 100 that can be caused by external pressure or load can be suppressed. The periphery member 101*b* can be molded with synthetic resin having no glass fiber or carbon fiber, for example, polycarbonate. Synthetic resin that does not include glass fiber or carbon fiber is suitable for surface treatment such as painting or coating, contributing to elegant appearance of the electronic device 100.

The electronic device 100 further includes a cover member 135. The cover member 135 is provided removable from the back side B of the electronic device 100 or the case or housing 101, for example, the rear surface portion R to conceal and protect the battery receiving portion 119. The outer surface of the inner member 101*a* that is not concealed by the periphery member 101*b* can be enclosed by the cover member 135. Such an exterior of the electronic device 100 can be formed of the periphery member 101*b*, the cover member 135, and a window member 102 to be described below.

The front side facing the rear surface portion R of the inner member 101*a* can be molded in an open state. On the open front side of the inner member 101*a*, the window member 102 is mounted to conceal an inner space of the case or housing 101. A display module 121, a bracket 131, and a main circuit board 133 can be disposed inside the window member 102. The window member 102 protects the display module 121 while passing a screen output by the display module 121 therethrough.

On the main circuit board 133, circuit devices such as a controller for controlling the overall operation of the electronic device 100, a communicator for performing wireless communication, and a storage in which various information is stored can be disposed. The conductive patterns 111*a* and 111*b* are connected to the main circuit board 133 and are fed with power from the main circuit board 133 to transmit and receive high-frequency signals. As mentioned previously, the conductive patterns 111*a* and 111*b* can be used as a sensor for detecting an approach or contact of the user body. For example, if a user's body part, for instance, a finger approaches or contacts the conductive patterns 111*a* and 111*b*, a resistance or a capacitance changes and the electronic device 100 detects the approach or contact of the user's body from the change.

To connect the conductive patterns 111*a* and 111*b* to the main circuit board 133, the electronic device 100 can include a connection member 137 (for example, an antenna feed) mounted on the main circuit board 133. The connection member 137 can include a pogo pin, a C-clip, or the like. A portion of the conductive patterns 111*a* and 111*b* can extend to the inner surface of the inner member 101*a* and connect to the main circuit board 133 through the connection member 137.

The bracket 131 is fixed to the inner member 101*a* to face the inner surface of the window member 102, and the display module 121 is supported and fixed to the bracket 131 between the bracket 131 and the window member 102. The bracket 131 faces the main circuit board 133. The bracket 131 can provide a shielding means for suppressing electric interference between various integrated circuit chips disposed on the main circuit board 133.

The display module 121 is disposed to face the inner surface of the window member 102 and outputs a screen to the user. If a touch panel is integrated into the window member 102, an input device, for example, a virtual keypad can be implemented by a combination of the display module 121 and the window member 102.

Figure 2:
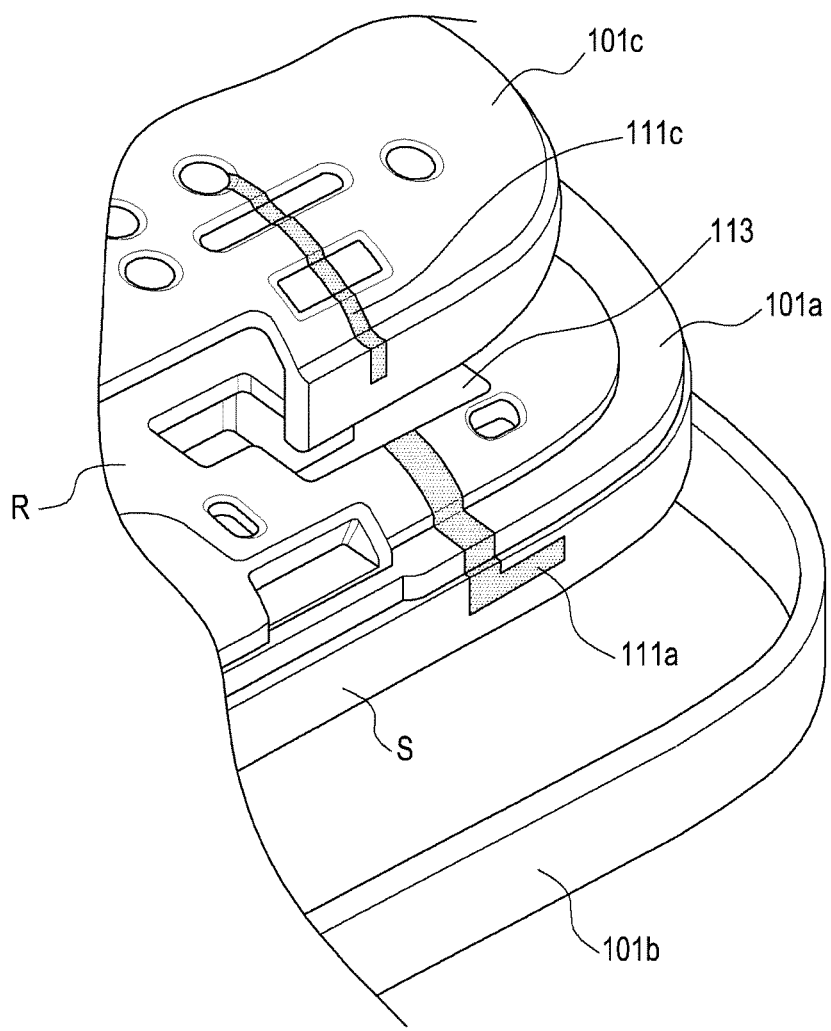
FIG. 2 is an enlarged view of a portion of an electronic device according to one of various embodiments of the present disclosure.
Figure 3:
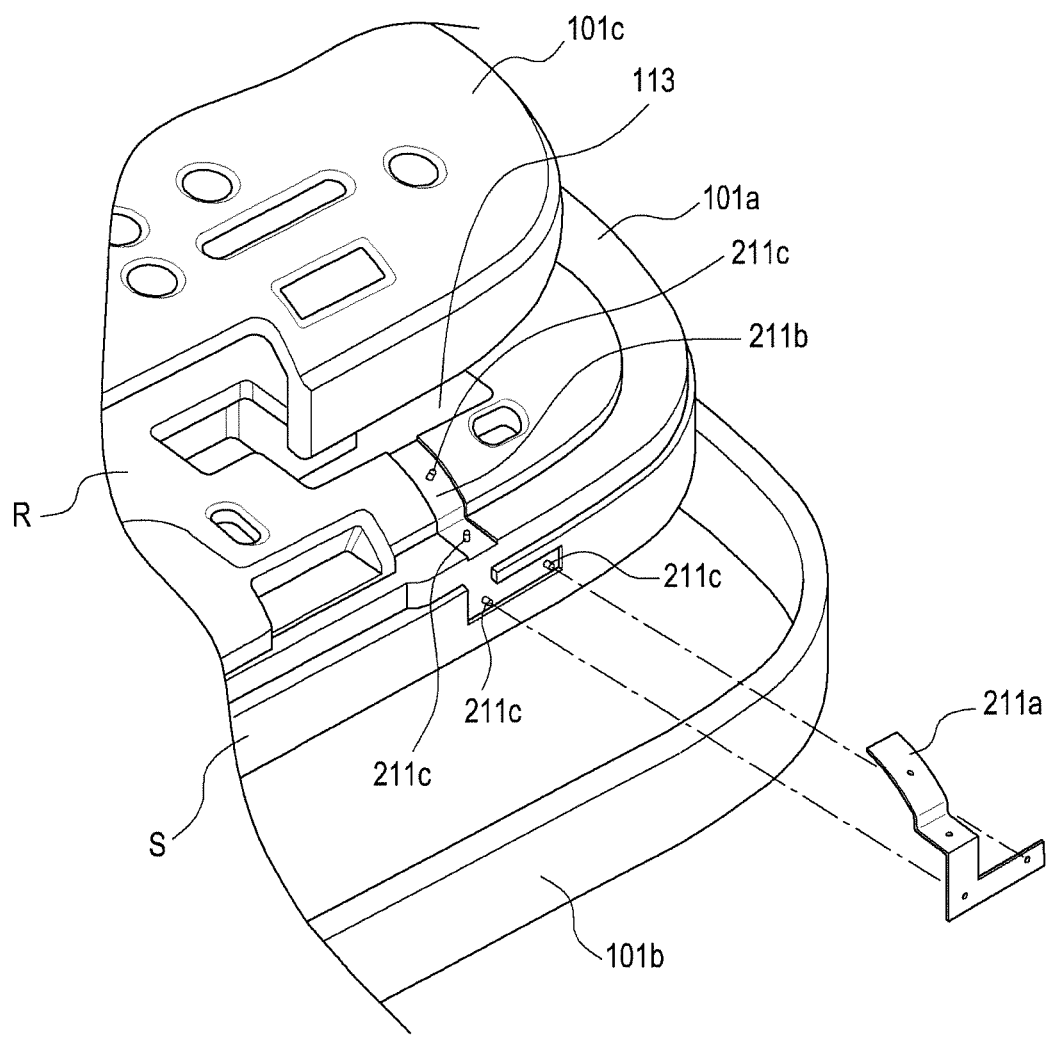
FIG. 3 is an enlarged view of a portion of an electronic device according to another one of various embodiments of the present disclosure.

FIG. 2 is an enlarged view of a portion of the electronic device 100 according to one of various embodiments of the present disclosure. FIG. 3 is an enlarged view of a portion of the electronic device 100 according to another one of various embodiments of the present disclosure.

Referring to FIG. 2, the conductive pattern 111*a* is formed of a metallic layer or a print layer. According to various embodiments, the inner member 101*a* can be molded with synthetic resin that at least partially includes metallic particles. In this case, the conductive pattern 111*a* can be formed of a metallic layer on the surface of the inner member 101*a* through Laser Direct Structuring (LDS) processing. According to an embodiment, the LDS processing etches a portion of the surface of an injection product using a laser to expose a portion of metallic particles included in the injection product, such that the exposed metallic particles can be used as a seed for plating or deposition. For example, metallic particles in a plating liquid, or vaporized metallic particles adsorb the exposed metallic particles in the etched portion of the inner member 101a, such that a metallic layer grows on the surface of the inner member 101a. When the conductive pattern 111a is formed, a metallic material having conductivity, such as gold, copper, or an alloy of them, can be used. In a detailed embodiment of the present disclosure, the surface of the inner member 101a is etched, but the surface of the inner member 101a can be etched using various other processing such as wet etching, plasma etching, sanding, sandblast processing, and the like.

When the conductive pattern 111a is formed of a print layer, the surface of the inner member 101a does not need to be etched with a laser. For example, the surface of the inner member 101a is partially processed using sanding or sandblast processing to improve the efficiency of adherence of conductive material application (for example, application of a conductive paint or ink, plating, or metallic deposition).

Referring to FIG. 2, the electronic device 100 can further include an auxiliary member 101c (for example, an auxiliary case, a speaker enclosure, an apparatus including an antenna pattern, or the like) as a portion of the case or housing 101 that includes the inner member 101a and the periphery member 101b. According to an embodiment, a metallic material can be included in at least a portion of the auxiliary member 101c. According to an embodiment, the auxiliary member 101c can be coupled by being included as the outer surface or inner surface of the inner member 101a (for example, an inner case) or at least a portion of the inner member 101a. According to another embodiment, another conductive pattern 111c can be formed on the surface of the auxiliary member 101c, and in an embodiment, the conductive pattern 111c can be connected to the conductive pattern 111a. For example, if the conductive pattern 111c is connected to the conductive pattern 111a, it can be formed as at least a portion of a radiator or a sensor (for example, a touch sensor, a grip sensor, or a proximity sensor). In an embodiment, the auxiliary member 101c can be formed to cover at least a portion of the rear surface portion R. According to another embodiment, at least a portion of the auxiliary member 101c can be interposed between the inner member 101a and the periphery member 101b. According to another embodiment, the auxiliary member 101c can be coupled to form or constitute at least a portion of the inner member 101a.

In FIG. 3, a conductive pattern 211a formed of a thin film (for example, a metallic thin film) or an FPCB is illustrated. Referring to FIG. 3, the conductive pattern 211a can be formed of a thin film (for example, a conductive metallic thin film) or an FPCB. According to an embodiment, the inner member 101a can have a fixing portion (for example, a fixing groove 211b or a fixing protrusion 211c) in at least a portion of the surface thereof to fix the conductive pattern 211a. In an embodiment, the fixing protrusion 211c can also be formed in the fixing groove 211b. According to various embodiments of the present disclosure, the conductive pattern 211a formed of a conductive thin film or FPCB can be seated and fixed in the fixing groove 211b. According to an embodiment, the fixing protrusion 211c passes through at least a portion of the conductive pattern 211a to fix the conductive pattern 211a on the surface of the inner case or the housing 101, for example, the fixing groove 211b. According to an embodiment, the fixing protrusion 211c fixes the conductive pattern 211a to the inner member 101a using various coupling schemes (for example, fusion, bonding, hook-fixing, or the like) while passing through the conductive pattern 211a.

Figure 4:
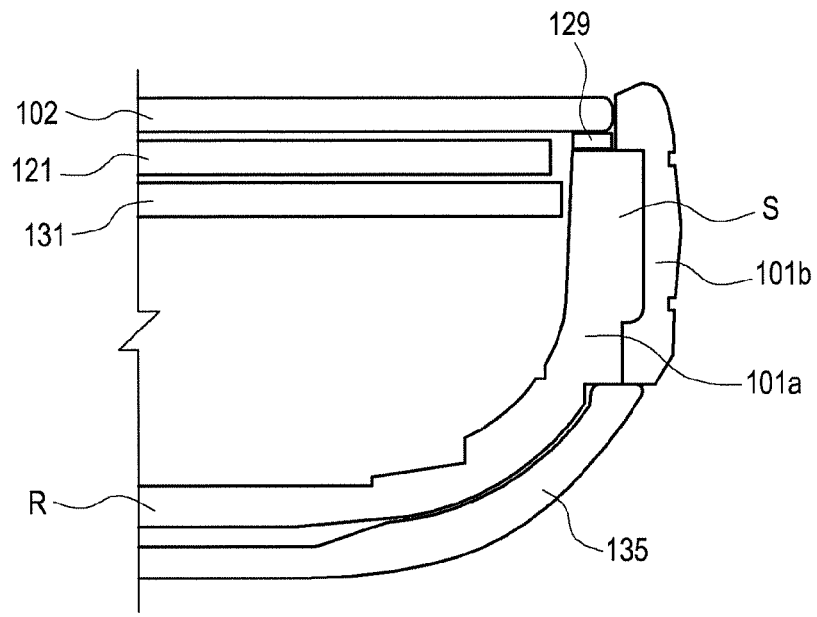
FIG. 4 is a cross-sectional view of a portion of an electronic device according to one of various embodiments of the present disclosure.

FIG. 4 is a cross-sectional view of a portion of the electronic device 100 according to one of various embodiments of the present disclosure.

Referring to FIG. 4, the window member 102 is disposed such that a circumference of the window member 102 is enclosed by the periphery member 101b. According to an embodiment, on the inner surface of the window member 102, an edge included in the window member 102, which is adjacent to the periphery member 101b, can be supported in the inner member 101a (for example, an inner case), for example, the side portion S. According to an embodiment, the window member 102 can be adhered to the inner member 101a by using an adhesive member (for example, a double-side tape) 129. The adhesive member 129 forms a sealing member for urging the window member 102 and the inner member 101a to closely contact without an empty space therebetween, and thus a water-proof structure can be formed. The sealing member providing the water-proof structure can be interposed between at least a portion of the edge of the window member 102 and at least a portion of the side portion S of the inner member 101a.

Figure 5:
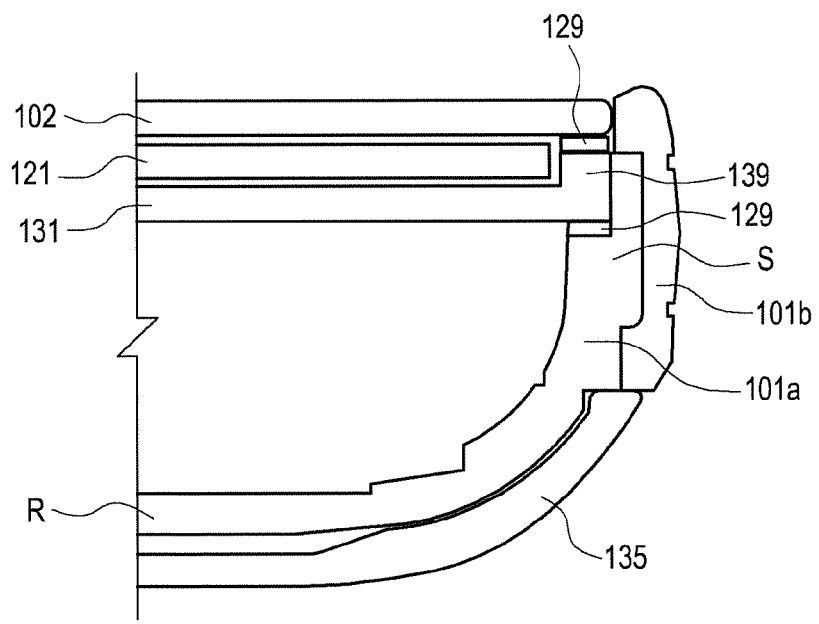
FIG. 5 is a cross-sectional view of a portion of an electronic device according to another one of various embodiments of the present disclosure.

FIG. 5 is a cross-sectional view of a portion of the electronic device 100 according to another one of various embodiments of the present disclosure.

Referring to FIG. 5, in an illustrated structure, a support rib 139 is formed in the edge of the bracket 131 to support the edge of the window member 102, and is disposed between the inner surface of the window member 102 and the side portion S. According to an embodiment, the edge of the bracket 131 is supported by the side portion S. According to an embodiment, the window member 102 can be adhered to the support rib 139 using the adhesive member (for example, the double-side tape) 129 and the edge of the bracket 131 can be adhered to the side portion S through another adhesive member 129. The adhesive members 129 can form a sealing member for urging the window member 102 and the bracket 131, and the bracket 131 and the inner member 101a to closely contact each other without an empty space therebetween, respectively, such that a water-proof structure can be formed.

According to various embodiments, the support rib 139 can provide a means for adhering and fixing the window member 102. The support rib 139 can also improve the rigidity or stiffness of the bracket 131 and the electronic device 100. For example, if the shape of the bracket 131 is a simple plate shape, the bracket 131 can be weak to bending or torsional deformation. The shape of the bracket 131 is formed such that a thickness of at least a portion of the bracket 131 is different from that of other portions through the support rib 139, thus suppressing bending or torsional deformation or reinforcing rigidity or stiffness (for example, tensile rigidity, bending rigidity, torsional rigidity, stress, hardness, or the like).

As illustrated in FIGS. 4 and 5, the window member 102 can be directly or indirectly supported in the inner member 101a, for example, the side portion S.

FIG. 6 is a cross-sectional view of a state in which the conductive pattern 111a is disposed in the electronic device 100 according to one of various embodiments of the present disclosure.

As mentioned previously, the conductive pattern 111a is positioned on the outer surface of the side portion S and extends to the inner surface of the inner member 101a across the outer surface of the rear surface portion R. On the inner surface of the inner member 101a, a portion of the conductive pattern 111a contacts the connection member 137. A portion of the conductive pattern 111a or a portion of an additional conductive pattern is positioned on the side portion S while facing the front side F of the electronic device 100. As at least a portion of the conductive pattern 111a is formed to face the front side F of the electronic device 100, transmission/reception of a Radio Frequency (RF) signal is possible through the front side F, the back side B, or the side of the electronic device 100.

The portion of the conductive pattern 111a, which is positioned on the side portion S while facing the front side F of the electronic device 100 or the housing 101, can be used for wireless communication that selectively operates according to user's need or according to 'preset conditions', such as wireless charging or Near Field Communication (NFC). Herein, 'operates according to 'preset conditions' can mean that as approaching electromagnetic waves generated in an external primary resonance antenna, the portion of the conductive pattern 111a positioned on a front-end surface of the side portion S can generate an induced electromotive force.

In the electronic device 100, when a case is structured, an inner member having rigidity, including glass fiber or carbon fiber, and a periphery member formed of a material that is easy to perform surface treatment are integrally molded by insert injection or double injection, thereby improving the rigidity of the electronic device 100 (for example, tensile rigidity, compression rigidity, bending rigidity, torsional rigidity, stress, hardness, or the like). In the electronic device 100, the conductive pattern is formed between the inner member and the periphery member, such that the electronic device 100 can be used as a sensor for sensing an approach or contact of a radiator of an antenna or a conductor such as a human body. Disposition of the conductive pattern secures a sufficient distance from circuit devices in the electronic device 100 and conceals the conductive pattern with the outer case, such that even when the conductive pattern is used as a radiator, degradation of radiation performance, caused by the human body, can be prevented.

FIG. 7 is a flowchart illustrating a method for manufacturing a case of the electronic device 100 according to one of various embodiments of the present disclosure. FIG. 8 is a flowchart illustrating an operation of disposing a conductive pattern in a case of the electronic device 100 according to one of various embodiments of the present disclosure.

A method for manufacturing a housing of an electronic device according to various embodiments of the present disclosure includes injecting resin into an injection mold to mold an inner member, extracting the inner member from the mold, forming or disposing a conductive pattern on a surface of the inner member, and inserting the inner member including the conductive pattern into the injection mold and injecting resin to mold a periphery member that encloses at least a portion of the inner member, in which rigidity or stiffness of the inner member is higher than that of the periphery member.

According to an embodiment, the inner member can be molded with synthetic resin including at least one of glass fiber and carbon fiber.

According to another embodiment, the periphery member can be molded with PolyCarbonate (PC).

According to another embodiment, the periphery member can be molded to enclose a side portion of the inner member.

In the method for manufacturing the housing, the inner member is molded with synthetic resin including metallic particles, and the operation of disposing the conductive pattern includes etching at least a portion of the surface of the inner member and forming a metallic layer on the etched portion of the surface of the inner member.

According to an embodiment, the metallic layer is formed by plating or deposition.

According to another embodiment, a fixing portion is formed on the surface of the molded inner member and the conductive pattern is fixed to the fixing portion.

According to another embodiment, the fixing portion includes a fixing groove corresponding to a shape of the conductive pattern.

According to another embodiment, the fixing portion includes a fixing protrusion passing through the conductive pattern.

According to another embodiment, in the operation of disposing the conductive pattern, a print layer is formed on the surface of the inner member using a conductive paint or ink.

In the method for manufacturing the housing, the molded inner member includes a first frame portion disposed in an edge of the case of the electronic device and a first reinforcing frame portion connecting two different portions of the first frame portion, and the method further includes removing the first reinforcing frame portion after molding the periphery member.

In the method for manufacturing the housing, the molded periphery member includes a second frame portion disposed in an edge of the case of the electronic device and a second reinforcing frame portion connecting two different portions of the second frame portion, and the method further includes removing the second reinforcing frame portion after molding the periphery member.

With reference to the above-described structure of the electronic device 100 and FIGS. 7 and 8, the method for manufacturing the case or housing 101 of the electronic device 100 will be described below. The case or housing 101 of the electronic device 100 includes the inner member 101a (for example, the inner case) and the periphery member 101b (for example, the outer case), and the inner member 101a and the periphery member 101b can be formed integrally by insert injection or double injection.

Referring to FIG. 7, the inner member 101a (for example, the inner case) can be molded or formed with synthetic resin including at least one of glass fiber and carbon fiber in operation S1. The operation of molding the inner member 101a includes coupling first mold and second mold that are separated to form a cavity corresponding to the shape of the inner member 101a, injecting and charging melt resin through a gate provided in a side of the cavity, cooling or hardening the melt resin, separating the first mold and the second mold to extract a molding product, and cutting the gate and unnecessary portions (for example, a gate runner, a reinforcing rib, and so forth) from the molding product. The inner member 101a uses synthetic resin including glass fiber or carbon fiber and thus has higher rigidity (for example, tensile rigidity, compression rigidity, bending rigidity, torsional rigidity, stress, hardness, or the like) than an injection product including no glass fiber or carbon fiber. Because of including glass fiber or carbon fiber, the inner member 101a has a rough surface.

Operation S2 disposes a conductive pattern (for example, the conductive patterns 111a, 111b, and 211a) on the surface of the inner member 101a molded in operation S1. The conductive pattern (for example, the conductive patterns 111a, 111b, and 211a) can include a metallic layer formed on the surface of the inner member 101a using plating or deposition or a print layer printed on the surface of the inner member 101a using a conductive paint or ink. The structure in which the conductive pattern (for example, the conductive patterns 111a and 111b) is formed of a metallic layer or a print layer will be described in more detail with reference to FIG. 8. In another embodiment, the conductive pattern (for example, the conductive pattern 211a) can be implemented using a metallic thin film or an FPCB adhered or fixed to the surface of the inner member 101a.

The method for manufacturing the housing of the electronic device 100 according to various embodiments of the present disclosure molds the periphery member 101b as being coupled to the surface of the inner member 101a by using a synthetic resin material such as polycarbonate that does not include glass fiber or carbon fiber in operation S3. The operation of molding the periphery member 101b includes coupling a first mold and a second mold that are separated to form a cavity corresponding to a shape of the housing 101, disposing the inner member 101a in a side of the cavity, injecting and charging melt resin through a gate provided in the side of the cavity, cooling or hardening the melt resin, separating the first mold and the second mold to extract a molding product, and cutting the gate and unnecessary portions (for example, a gate runner, a reinforcing rib, and so forth) from the molding product. The periphery member 101b is molded using synthetic resin that does not include glass fiber or carbon fiber to facilitate surface treatment such as painting or coating.

After the periphery member 101b is integrally molded in the inner member 101a, a mold foreign substance or a reinforcing structure is removed and finishing for surface treatment such as painting or coating can be performed in operation S4.

After molding of the injection product, a foreign substance can be generated along the circumference of an injection mold shape-matching portion. The foreign substance can degrade the quality of the exterior or the assembling property, and thus can be removed. In an embodiment, a reinforcing structure for preventing deformation of the inner member can be formed, and after completion of molding, the reinforcing structure is removed and then can be coupled with another member of the electronic device 100. The injection product itself can be used as a product, but for improvement of exterior quality, surface treatment, such as painting or coating, can be performed on the injection product. After a foreign substance or a reinforcing structure is removed from the inner case or the outer case molded in operation S4, surface treatment for improving exterior quality can be performed.

Referring to FIG. 8, a conductive pattern (for example, the conductive patterns 111a and 111b) including a metallic layer is formed or disposed by plating or deposition. According to various embodiments, to form the metallic layer using plating or deposition, the inner member 101a is molded with synthetic resin including metallic particles. According to an embodiment, a portion of the surface of the inner member 101a made of synthetic resin including metallic particles is etched using, for example, a laser in operation S21. The etched portion of the surface of the inner member 101a can have a pattern for implementing various frequency and radiation characteristics depending on a communication function embedded in the electronic device 100. In an embodiment, in the etched portion of the inner member 101a, some of the metallic particles can be exposed.

In operation S22, the metallic layer grows and is formed by plating or deposition, in which the metallic particles exposed in the etched portion of the inner member 101a can be used as a seed for growth of the metallic layer. For example, metallic particles in a plating liquid or vaporized metallic particles adsorb the metallic particles exposed in the etched portion of the inner member 101a, such that the metallic layer grows on the surface of the inner member 101a. Thus, on the surface of the inner member 101a, a conductive pattern (for example, the conductive patterns 111a and 111b) including the metallic layer can be formed.

In another embodiment, the conductive pattern (for example, the conductive patterns 111a and 111b) can include a print layer formed of a conductive paint or ink. Before formation of the print layer, the surface of the inner member 101a can be treated using sanding or sandblast. Through such surface treatment, an affinity of the conductive paint or ink with respect to the surface of the inner member 101a can be improved.

In an embodiment, for a conductive pattern (for example, the conductive pattern 211a) manufactured with a metallic thin film or an FPCB, the conductive pattern can be directly adhered or fixed to the surface of the inner member 101a molded in operation S1. To stably fix the conductive pattern (for example, the conductive pattern 211a) in the form of a metallic thin film or an FPCB, a fixing portion (for example, the fixing groove 211b or the fixing protrusion 211c) is formed on the surface of the inner member 101a in operation S1. The fixing groove 211b or the fixing protrusion 211c stably fix the conductive pattern (for example, the conductive pattern 211a) manufactured separately from the inner member 101a, in a secondary molding operation, for example, operation S3 of molding the periphery member 101b.

According to an embodiment, the inner member 101a (for example, the inner case) is molded with synthetic resin including at least one of glass fiber and carbon fiber, thus improving the rigidity (for example, tensile rigidity, compression rigidity, bending rigidity, torsional rigidity, stress, hardness, or the like) of the case or housing 101 of the electronic device 100.

According to various embodiments, the periphery member, for example, the periphery member 101b is molded with polycarbonate, and thus can be suitable for surface treatment such as painting or coating.

With reference to FIGS. 9 through 14, other various embodiments of the present disclosure will be described. When the embodiments of the present disclosure are described, configurations that be easily understood from foregoing embodiments will be given the same reference numerals as used in the previous embodiments, and a detailed description thereof can be omitted. Moreover, it should be also noted that FIGS. 9 through 14 can illustrate a portion of the electronic device 100.

Figure 9:
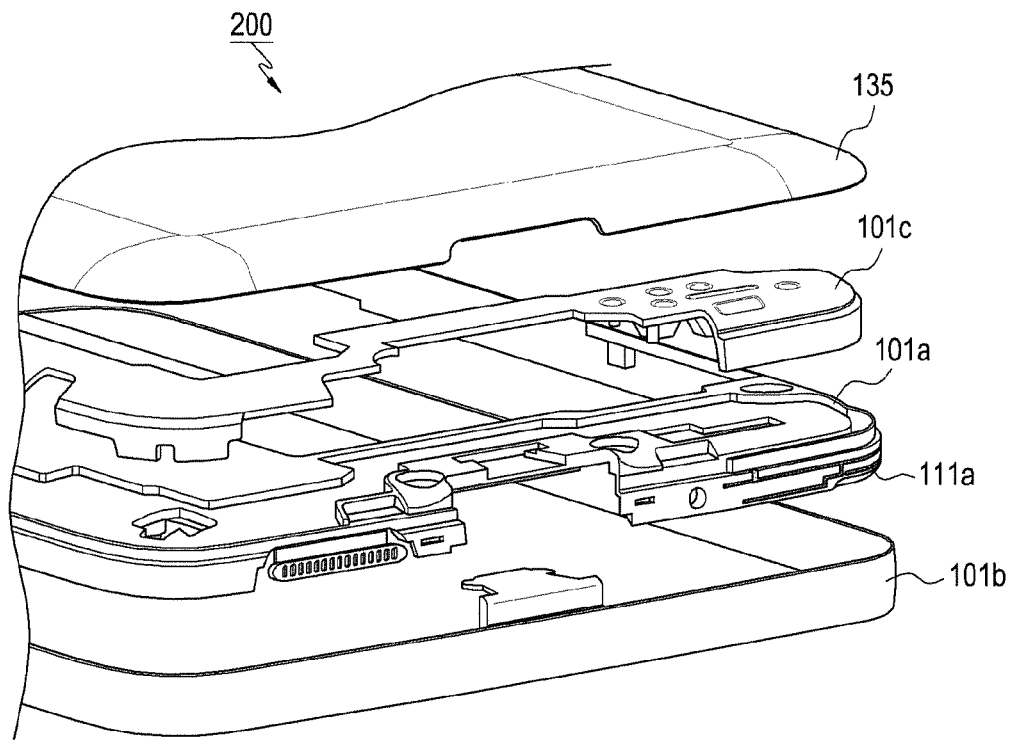
FIG. 9 is an exploded perspective view of an electronic device according to another one of various embodiments of the present disclosure.

FIG. 9 is an exploded perspective view of an electronic device 200 according to another one of various embodiments of the present disclosure.

Referring to FIG. 9, the electronic device 200 according to another one of various embodiments of the present disclosure can include the inner member 101a, the periphery member 101b, the auxiliary member 101c, and the cover member 135. In the current embodiment, the auxiliary member 101c can be provided to enclose at least a portion of the inner member 101a. In another embodiment, the auxiliary member 101c can be formed as a portion of the inner member 101a. As can be seen from FIGS. 11 and 12, a portion of the auxiliary member 101c, for example, a side portion can be at least partially enclosed by the inner member 101a. According to an embodiment, the conductive pattern 111a can be formed in at least a portion of the outer surface of the side portion of the inner member 101a.

According to another embodiment, the conductive pattern 111a can be used as a sensor for detecting an approach or contact of a radiator of an antenna or a human body. According to an embodiment, the conductive pattern 111a can include a metallic layer formed using LDS or a metallic thin film adhered to the inner member 101a.

Figure 10:
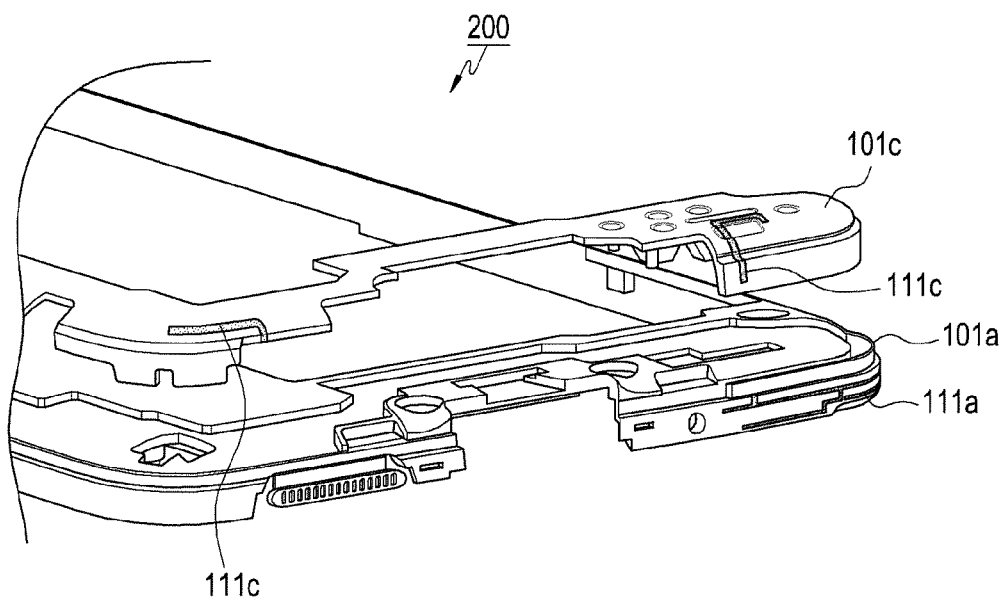
FIG. 10 is an exploded perspective view of a modified example of an electronic device according to another one of various embodiments of the present disclosure.

FIG. 10 is an exploded perspective view of a modified example of the electronic device 200 according to another one of various embodiments of the present disclosure.

Referring to FIG. 10, the electronic device 200 can further include at least one another conductive pattern 111c formed in the auxiliary member 101c. According to an embodiment, the other conductive pattern 111c can be formed as a radiator for providing a wireless communication function in a frequency band that is different from that of the conductive pattern 111a. According to another embodiment, the other conductive pattern 111c can be electrically connected to the conductive pattern 111a. According to an embodiment, the other conductive pattern 111c can be provided as plural patterns in the auxiliary member 101c. In this case, at least one of the plurality of conductive patterns 111c can be independently formed as radiators for providing a wireless communication function in the same band or different bands, and another one of the plurality of conductive patterns 111c can be formed as a radiator connected to the conductive pattern 111a. The conductive pattern 111a and the other conductive pattern 111c can be formed as sensors for detecting an approach or contact of a conductor as well as radiators of an antenna.

Figure 11:
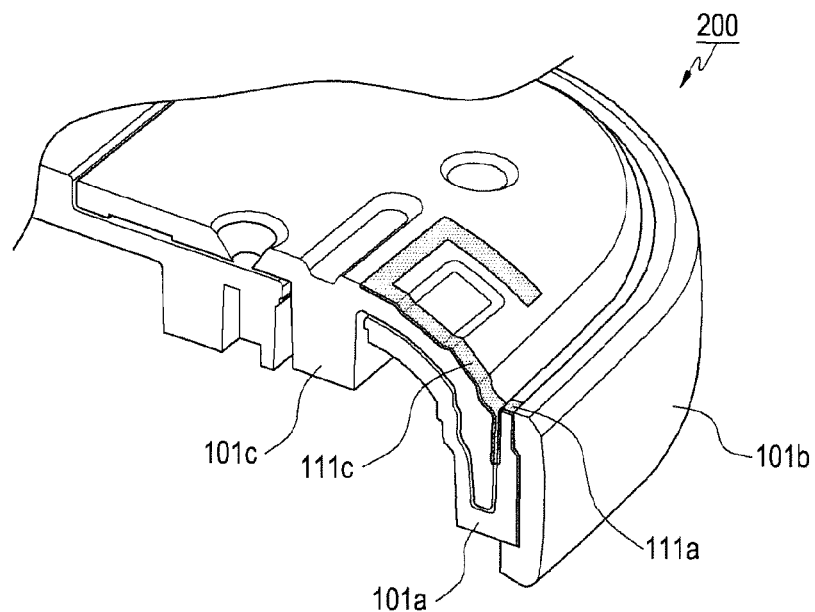
FIG. 11 is a perspective view for describing another modified example of an electronic device according to another one of various embodiments of the present disclosure.
Figure 12:
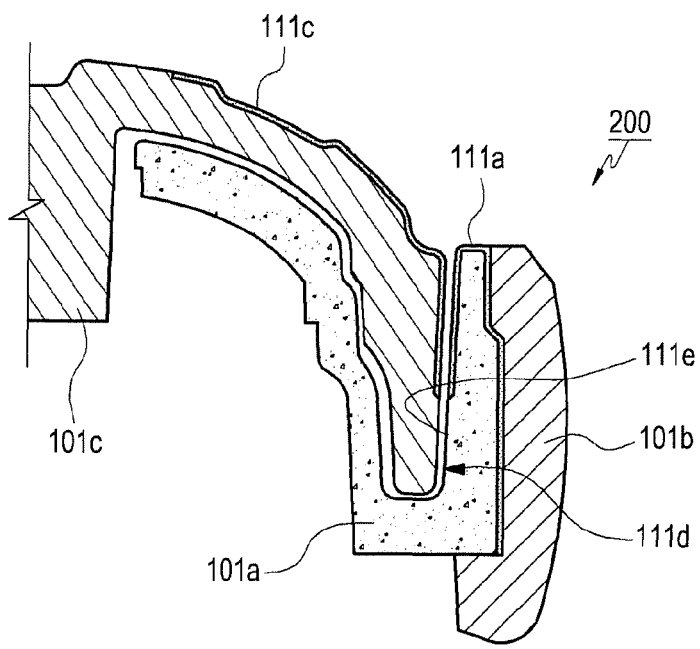
FIG. 12 is a cross-sectional view for describing another modified example of an electronic device according to another one of various embodiments of the present disclosure.

FIG. 11 is a perspective view for describing another modified example of the electronic device 200 according to another one of various embodiments of the present disclosure. FIG. 12 is a cross-sectional view for describing another modified example of the electronic device 200 according to another one of various embodiments of the present disclosure.

Referring to FIGS. 11 and 12, a portion of the auxiliary member 101c is coupled to be enclosed by the inner member 101a. For example, a gap 111d can be formed in at least a portion (for example, the outer surface) of the inner member 101a to receive at least a portion of the auxiliary member 101c.

According to an embodiment, a portion of the conductive pattern 111a can be formed on an inner wall 111e of the gap 111d formed in the inner member 101a and a portion of the other conductive pattern 111c can be formed on the outer surface of the auxiliary member 101c, such that those portions face each other. In this case, the other conductive pattern 111c can be electrically connected to the conductive pattern 111a by contactless coupling (for example, capacitive coupling or inductive or electromagnetic inductive coupling) or contact coupling.

Although the periphery member 101b has a frame shape in such a way to enclose at least a portion of the outer surface of the inner member 101a in the previous embodiments, the inner member and the periphery member can have a frame shape in such a way that the most part of the inner member is enclosed by the periphery member in an embodiment.

Figure 13:
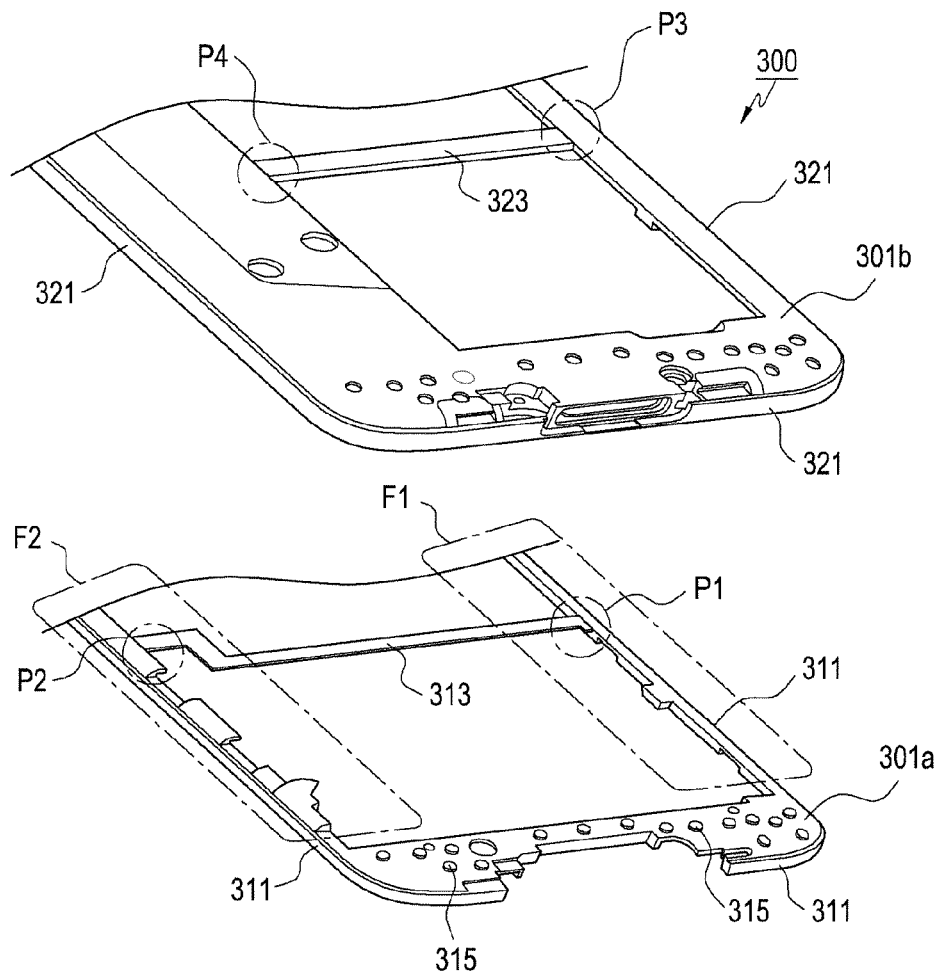
FIG. 13 is an exploded perspective view of an electronic device according to another one of various embodiments of the present disclosure.
Figure 14:
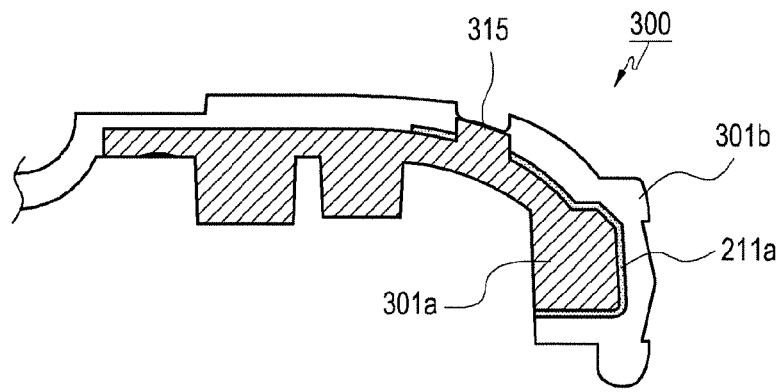
FIG. 14 is a cross-sectional view of an electronic device according to another one of various embodiments of the present disclosure.

FIG. 13 is an exploded perspective view of an electronic device 300 according to another one of various embodiments of the present disclosure, and FIG. 14 is a cross-sectional view of the electronic device 300 according to another one of various embodiments of the present disclosure.

When the electronic device 200 in the embodiment illustrated in FIGS. 13 and 14 is described, configurations that can be easily understood from the previous embodiments will not be described in detail.

Referring to FIGS. 13 and 14, an inner member 301a can be formed in a shape similar to a frame shape. For example, the inner member 301a can be formed along the edge of a periphery member 301b in the form of a frame of the periphery member 301b. The periphery member 301b can be formed in a shape similar to a frame to receive the inner member 301a. If the periphery member 301b is made of a synthetic resin (for example, polycarbonate) material to facilitate implementation of Color, Material, Finishing (CMF), then the inner member 301a is manufactured with reinforced rigidity by using a complex material such as synthetic resin including glass fiber or carbon fiber, thereby complementing structural rigidity or stiffness (for example, tensile rigidity, bending rigidity, torsional rigidity, stress, hardness, or the like) or the periphery member 301b. However, without being limited to this example, the inner member 301a can be made of a synthetic resin (for example, polycarbonate) material and the outer member 301b can be made of a complex material such as synthetic resin including glass fiber or carbon fiber.

According to an embodiment, the inner member 301a can include a frame portion 311 disposed in at least an edge of a case of the electronic device 300 and a reinforcing frame portion 313 connecting different portions P1 and P2 of the frame portion 311. For example, the reinforcing frame portion 313 can connect parallel-extending portions F1 and F2 of the frame portion 311. According to an embodiment, if the inner member 301a is made in a frame shape, the inner member 301a can be deformed by pressure or heat of injection of melt resin during hardening of the melt resin or molding of the outer member 301b (for example, insert injection or double injection. In the method for manufacturing the housing according to various embodiments of the present disclosure, the reinforcing frame 313 is formed to prevent deformation of the inner member 301a during hardening or molding (for example, insert injection or double injection).

The outer member 301b can also include a second frame portion 321 disposed in at least an edge of the case of the electronic device 300 and a second reinforcing frame portion 323 connecting different portions P3 and P4 of the second frame portion 321. By forming the second reinforcing frame portion 323, deformation of the outer member 301b during hardening or molding (for example, insert injection or double injection) can be prevented.

According to another embodiment of the present disclosure, multiple protrusions 315 can be formed on the outer surface of the inner member 301a. According to an embodiment, by forming the protrusions 315, a superficial area in which the inner member 301a and the outer member 301b are shape-matched increases, making the case of the electronic device 300 strong and firm. According to another embodiment, the protrusions 315 can be used as fixing protrusions for fixing the conductive pattern 211a disposed on the surface of the inner member 301a. Referring to FIG. 14, for example, the protrusion 315 can pass through at least a portion of the conductive pattern 211a when the conductive pattern 211a is adhered to the inner member 301a. If the conductive pattern 211a is provided using a conductive thin film or an FPCB, the protrusions 315 can firmly fix the conductive pattern 211a to the surface of the inner member 301a during molding (for example, insert injection or double injection) of the outer member 301b.

When various embodiments of the present disclosure are described with reference to the accompanying drawings, the periphery members 101b and 301b are manufactured and assembled separately from the inner members 101a and 301a, the inner members 101a and 301a and the periphery members 101b and 301b can be formed integrally during molding (for example, insert injection or double injection) like in the previous embodiments.

The conductive patterns can be connected to a communication module and a sensor module to function differently according to an operating environment, as mentioned previously. For example, the conductive patterns can provide a communication function in a wireless LAN. According to another embodiment, if sensing an approach of a user's body, the conductive patterns can sense an input (for example, a user input) to perform a preset operation (for example, a click or scroll function). Utilization of the conductive patterns will be described with reference to FIG. 15.

Figure 15:
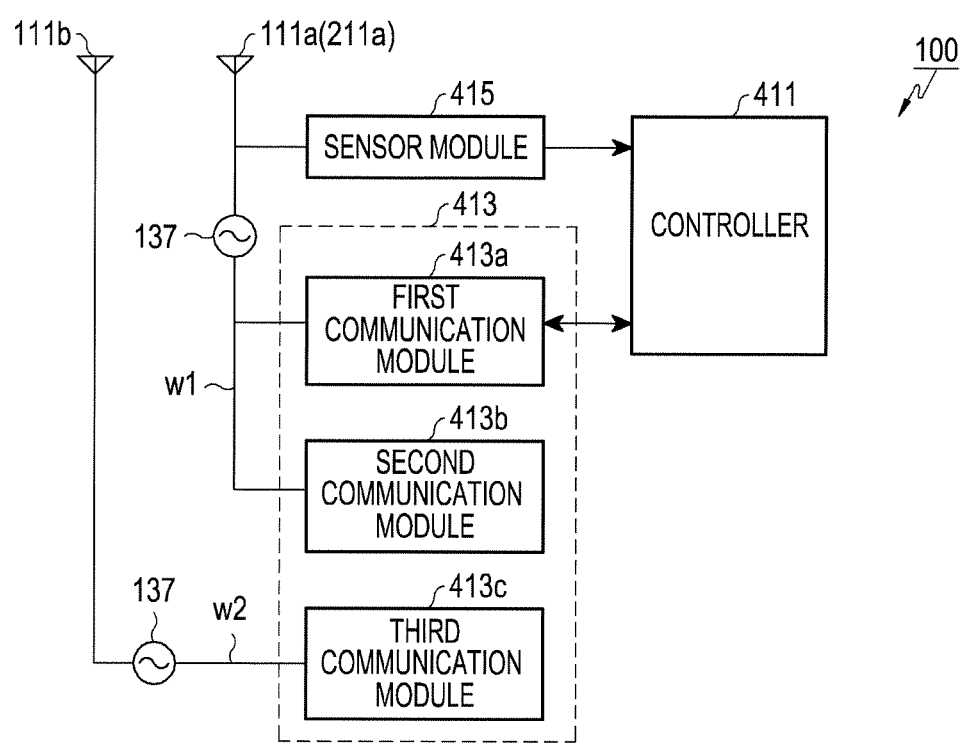
FIG. 15 is a structural view of an electronic device according to various embodiments of the present disclosure.

FIG. 15 is a structural view of the electronic device 100 according to various embodiments of the present disclosure.

Referring to FIG. 15, the electronic device 100 can include a controller 411, a communicator 413 provided between the conductive patterns 111a, 111b, and 211a, and a sensor module 415. The electronic device 100 can also include a display including a display module (for example, the display module 121), a storage for storing various information files, and an input/output device such as various keypads and speakers. However, well-known components such as the display, the storage, and the input/output device will not be described in detail.

The controller 411 controls the overall operation of the electronic device 100. For example, the controller 411 can control an operation of playing a multimedia file stored in the storage and outputting the multimedia file through the display module 121 or the speaker. The controller 411 can also include a modem for processing transmission/reception signals of the communicator 413 to be described below, and can separately process transmission/reception signals of various communication modules 413a, 413b, and 413c of the communicator 413.

The communicator 413 can be connected to the conductive patterns 111a and 111b through the connection members 137. The connection members 137 can be formed as antenna feeders of the conductive patterns 111a and 111b, and can be connected to the communicator 413 through wiring portions w1 and w2 provided on the main circuit board 133. The communicator 413 can include at least one communication modules 413a, 413b, and 413c that process signals in different frequency bands, respectively. The communication modules 413a, 413b, and 413c can correspond to at least one of Long Term Evolution (LTE), Worldwide Interoperability for Microwave Access (WiMAX), Code Division Multiple Access (CDMA), Global System for Mobile communications (GSM), Personal Communication Service (PCS), a Digital Cellular System (DCS), Wideband Code Division Multiple Access (WCDMA), Evolution-Data Optimized (EVDO), High Speed Packet Access (HSPA), a Global Positioning System (GPS), Bluetooth (BT), and Wireless Fidelity (WiFi). The controller 411 activates a corresponding communication module according to a change in a communication environment (for example, a handover to a heterogeneous network) or a user-set environment.

One of the conductive patterns 111a and 111b, for example, the conductive pattern 111a can transmit and receive RF signals in at least one frequency band. The conductive pattern 111a is connected to the sensor module 415 to provide a sensor function. The conductive pattern 111b can transmit and receive RF signals in another frequency band. Once an additional sensor module is connected, the conductive pattern 111b can also provide a sensor function.

The sensor module 415 outputs, to the controller 411, a change in a capacitance or a change in a resistance, which occurs as a conductor, for example, a user's body such as a user's hand, approaches the conductive pattern 111a. If the change in the capacitance (for example, a magnetic capacitance, a mutual capacitance, or a combination thereof) or the change in the resistance detected by the sensor module 415 reaches a threshold value, the controller 411 executes a particular command. Herein, the 'particular command' can be movement or execution of a user-selected menu, screen scroll, or adjustment of signal power supplied to the conductive pattern 111a.

Figure 16:
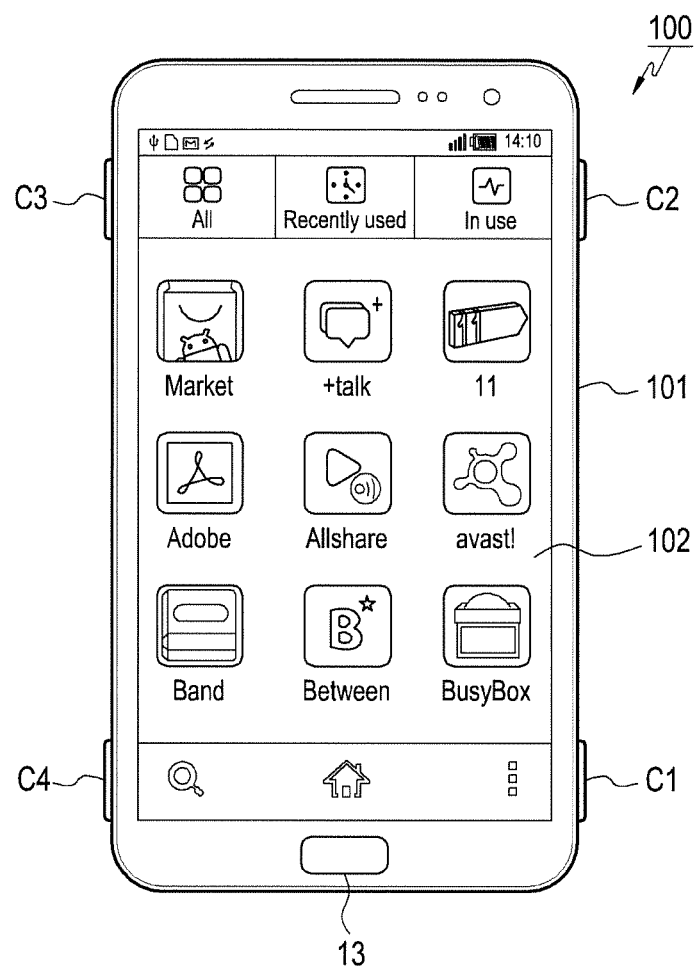
FIG. 16 is a view for describing use of an electronic device according to various embodiments of the present disclosure.

FIG. 16 is a view for describing use of the electronic device 100 according to various embodiments of the present disclosure.

Referring to FIG. 16, touch sensors are disposed in four positions C1, C2, C3, and C4 in a side of the housing 101. While the four different positions are illustrated as protruding from the side of the housing 101 in FIG. 16, it should be noted that such illustration is merely intended to clearly indicate positions where the touch sensors are disposed. For example, the four different positions C1, C2, C3, and C4 can be provided as a flat surface or a curved surface matching another portion of the side of the housing 101. The four different positions C1, C2, C3, and C4 can be provided between the inner member 101a and the outer member 101b in the housing 101 including the inner member 101a and the periphery member 101b. However, the touch sensors disposed in the four different positions C1, C2, C3, and C4 can include the above-described conductive patterns (for example, the conductive patterns 111a, 111b, and 211a). The touch sensors disposed inside the electronic device 100 can be disposed in at least a portion of the electronic device 100, and one or more touch sensors can be included in the electronic device 100. The touch sensors are not limited as being disposed in a portion of the housing 101. The touch sensors can be disposed on the back side of the window 102, between the window 102 and the display module 121, or on the cover member 135.

The touch sensors disposed in the respective positions can be used for different purposes depending on an operation mode of the electronic device 100. According to an embodiment, if the electronic device 100 connects to the Internet, the touch sensor in the position C2 or C3 is activated to be used for screen scroll or selection and movement of a hyperlink. According to another embodiment, if the electronic device 100 is in a sleep mode, the user can simultaneously contact at least two of the touch sensors disposed in the four positions C1, C2, C3, and C4 to activate the electronic device 100. According to another embodiment, if the electronic device 100 is activated, the user can simultaneously contact at least two of the touch sensors disposed in the four positions C1, C2, C3, and C4 to change the operation mode of the electronic device 100.

A description will now be made of a structure in which the conductive patterns (for example, the conductive patterns 111a, 111b, and 211a) of the electronic device 100 operate as touch sensors in a camera mode.

If a user's body simultaneously contacts at least two of the touch sensors disposed in the four different positions C1, C2, C3, and C4, the electronic device 100 can switch to the camera mode depending on a duration of the contact. Also, depending on the number or positions of touch sensors the user simultaneously contacts, the electronic device 100 can switch to another operation mode.

In the camera mode, the touch sensor disposed in the position C1 can be set to a shutter button and the touch sensor disposed in the position C3 can be set to a zoom-in/zoom-out button. For example, when the user contacts the position C3, a zoom-in/zoom-out function can be implemented according to a user's drag direction. The zoom-in/zoom-out function can be implemented by combining the touch sensors disposed in other positions. For example, in the camera mode, the user contacts the touch sensor disposed in the position C2 to implement the zoom-in function and simultaneously contacts the touch sensors disposed in the positions C2 and C3 to implement the zoom-out function. In the camera mode, the touch sensor disposed in the position C4 can be used as a button for activating/deactivating switchover of a photographing mode (for example, a portrait mode, a landscape mode, a night view mode, or the like), calling of a captured image, or a flash function.

If simultaneous contact of at least two of the four positions C1, C2, C3, and C4 by the user's body is sensed in the camera mode, the electronic device 100 can terminate the camera mode according to a duration of the contact. In the camera mode, the electronic device 100 can immediately switch to other operation modes depending on the number or positions of touch sensors the user simultaneously contacts.

The electronic device and the method for manufacturing the housing according to various embodiments of the present disclosure can secure a sufficient interval between the circuit devices (for example, a PCB interconnection, a PCB ground, a semiconductor chip, a resistor, a capacitor, an inductor, and so forth) and the conductive pattern included as at least a portion of the antenna for use as the radiator. If the conductive pattern is used as the radiator of the antenna, because the outer case is disposed between the conductive pattern and the human body even when the conductive pattern is enclosed by the human body or is close to the human body, stable radiation performance can be guaranteed. In addition, by manufacturing the inner case with synthetic resin of a material capable of securing rigidity or stiffness, the rigidity or stiffness of the electronic device can be improved, and by manufacturing the outer case with synthetic resin of a material that is easy to perform painting or coating, the aesthetic sense of the exterior of the electronic device can be improved. Furthermore, the conductive pattern can be used as both the radiator of the antenna and the sensor, allowing efficient use of an inner space of the electronic device.

Although the present disclosure has been described with an exemplary embodiment, various changes and modifications may be suggested to one skilled in the art. It is intended that the present disclosure encompass such changes and modifications as fall within the scope of the appended claims. For example, although a mesh grill for a speaker output hole, a key made of a conductive material, or a metallic accessory provided along the circumference of the key has been described as an example of an accessory member in various embodiments of the present disclosure, a metallic case for providing a shielding function while reinforcing the rigidity or stiffness of various connectors may be connected with a conductive pattern for use as a radiator.

What is claimed is:
1. An electronic device comprising:
a housing comprising a front side and a back side facing an opposite side of the front side;
a periphery member forming at least a portion of an edge of the housing, and comprising a non-metallic material;
an inner member that forms at least a portion of the housing inside the periphery member, along at least a portion of the edge in adjacent to the periphery member, and comprises a metallic material, the inner member further comprising a rear surface portion forming at least a portion of the back side of the housing and a side portion extending from the rear surface portion along the edge; and
a conductive pattern, at least a portion of which being inserted between the periphery member and the inner member,
wherein the inner member has higher rigidity or stiffness than the periphery member,
wherein the periphery member is formed to enclose at least a portion of the rear surface portion or the side portion,
wherein at least a portion of the conductive pattern is formed in the side portion of the inner member, facing the front side of the housing.

2. The electronic device of claim 1, wherein at least a portion of the conductive pattern is disposed between the side portion and the periphery member.

3. The electronic device of claim 1, wherein the inner member substantially has a rectangular frame shape in adjacent to the edge of the housing or has a frame shape, in at least a portion of which a gap is formed.

4. The electronic device of claim 3, further comprising:
a bracket that is coupled to a portion of the side portion of the inner member and faces the front side; and
a window member at least partially contained in a space formed by the bracket and the side portion.

5. The electronic device of claim 4, further comprising:
a sealing member interposed between at least a portion of an edge of the window member and at least a portion of the side portion of the inner member.

6. The electronic device of claim 4, wherein the window member is positioned to be enclosed by the periphery member and a portion of an inner surface of the window member is directly or indirectly supported on the side portion.

7. The electronic device of claim 6, further comprising:
a support rib formed in an edge of the bracket,
wherein the bracket is disposed to face the inner surface of the window member and the support rib is interposed between the side portion and the window member.

8. The electronic device of claim 1, wherein the conductive pattern extends from an outer surface of the side portion to an inner surface of the inner member through an outer surface of the rear surface portion.

9. The electronic device of claim 1, further comprising:
an opening formed to pass through the side portion of the inner member; and
an accessory member made of a conductive material in the opening,
wherein the accessory member is electrically connected to the conductive pattern.

10. The electronic device of claim 9, wherein the accessory member comprises at least one of a mesh grill for a speaker output hole, a key, an interface connector deco, a camera deco or cover.

11. The electronic device of claim 1, further comprising:
an auxiliary member coupled to enclose at least a portion of the inner member; and
another conductive pattern disposed on a surface of the auxiliary member.

12. The electronic device of claim 1, further comprising:
a sensor module connected to the conductive pattern, wherein the sensor module is configured to detect an approach or contact of a conductor from a change in a capacitance or a resistance of the conductive pattern.

13. The electronic device of claim 1, further comprising:
a communication module;
an antenna feed contacting the conductive pattern; and
a wiring portion electrically connecting the antenna feed with the communication module.

14. An electronic device comprising:
a housing including a front side and a back side facing an opposite side of the front side;
a periphery member forming at least a portion of an edge of the housing, and comprising a non-metallic material;
an inner member that forms at least a portion of the housing inside the periphery member, along at least a portion of the edge in adjacent to the periphery member, and comprises a metallic material, the inner member further comprising a rear surface portion forming at least a portion of the back side of the housing and a side portion extending from the rear surface portion along the edge;
a bracket that is coupled to a portion of the side portion of the inner member and faces the front side;
a window member at least partially contained in a space formed by the bracket and the side portion; and
a conductive pattern, at least a portion of which being inserted between the periphery member and the inner member,
wherein the inner member has higher rigidity or stiffness than the periphery member,
wherein the periphery member is formed to enclose at least a portion of the rear surface portion or the side portion,
wherein the inner member substantially has a rectangular frame shape in adjacent to the edge of the housing or has a frame shape, in at least a portion of which a gap is formed, and
wherein at least a portion of the conductive pattern is formed in the side portion of the inner member, facing the front side of the housing.

* * * * *